(12) United States Patent
Pezzetti, Jr. et al.

(10) Patent No.: US 7,491,029 B2
(45) Date of Patent: Feb. 17, 2009

(54) ACTIVE CLEARANCE CONTROL SYSTEM FOR GAS TURBINE ENGINES

(75) Inventors: Michael C. Pezzetti, Jr., Vernon Rockville, CT (US); Daniel E. Kane, Tolland, CT (US); Craig B. Pease, East Haddam, CT (US); John T. Reinard, Jr., Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 109 days.

(21) Appl. No.: 11/251,374

(22) Filed: Oct. 14, 2005

(65) Prior Publication Data

US 2007/0086887 A1 Apr. 19, 2007

(51) Int. Cl.
*F01D 11/08* (2006.01)

(52) U.S. Cl. .................. 415/1; 415/138; 415/173.2; 415/176; 415/116

(58) Field of Classification Search .................. 415/116, 415/173.1, 173.2, 138, 175, 176, 178
See application file for complete search history.

(56) References Cited

U.S. PATENT DOCUMENTS

| 4,527,385 | A | * | 7/1985 | Jumelle et al. | ............ 415/173.2 |
| 5,048,288 | A | * | 9/1991 | Bessette et al. | ............ 415/116 |
| 5,205,115 | A | * | 4/1993 | Plemmons et al. | ........ 415/173.1 |
| 5,593,278 | A | * | 1/1997 | Jourdain et al. | ........... 415/173.2 |
| 6,035,929 | A | * | 3/2000 | Friedel et al. | ............ 415/173.2 |
| 6,659,716 | B1 | * | 12/2003 | Laurello et al. | ............. 415/116 |

* cited by examiner

*Primary Examiner*—Igor Kershteyn
(74) *Attorney, Agent, or Firm*—Bachman & LaPointe, P.C.

(57) ABSTRACT

A gas turbine engine generally includes a compressor, a combustor, and a turbine. The turbine can include an integrated manifold comprising a plenum defined by a manifold disposed in connection with a divider plate and opposite a shielding plate comprising a plurality of apertures. During operation of the gas turbine engine, a quantity of working fluid enters the integrated manifold and circulates throughout the plenum and shielding plate, and enters the turbine through the apertures to actively control clearances between turbine engine components.

7 Claims, 3 Drawing Sheets

ACTIVE CLEARANCE CONTROL SYSTEM FOR GAS TURBINE ENGINES

FIELD OF USE

This disclosure relates to gas turbine engines and, more particularly, relates to active clearance control systems for gas turbine engines.

BACKGROUND OF THE INVENTION

The control of the radial clearance between the tips of rotating blades and the surrounding annular shroud in axial flow gas turbine engines is one known technique for proving engine efficiency. By reducing the blade tip to shroud clearance, designers can reduce the quantity of turbine working fluid which bypasses the blades, thereby increasing engine power output for a given fuel or other engine input.

"Active clearance control" refers to those clearance control arrangements wherein a quantity of working fluid is employed by the clearance control system to regulate the temperature of certain engine structures and thereby control the blade tip to shroud clearance as a result of the thermal expansion or contraction of the cooled structure. It is a feature of such active clearance control systems that the cooling air flow may be switched or modulated responsive to various engine, aircraft, or environmental parameters for causing a reduction in blade tip to shroud clearance during those portions of the engine operating power range wherein such clearance control is most advantageous.

Such active clearance control systems typically consist of multiple parts. These multiple parts not only add weight to the engine structure but also introduce additional parts that may expand and contract under the extreme operating environment. The expansion and contraction of these additional parts must be considered in determining the clearance distance(s) between blade tips and shroud as the additional parts expand and exert inward radial force(s) upon the shroud which could interfere with the blade function.

Consequently, there exists a need for an active clearance control system for gas turbine engines that comprise fewer parts and achieve the desired clearance control aspects without interfering with the function of the gas turbine engine components.

SUMMARY OF THE INVENTION

In accordance with the present invention, a gas turbine engine broadly comprises a compressor; a combustor; and a turbine, wherein the turbine includes an integrated manifold broadly comprising a plenum defined by a manifold disposed in connection with a divider plate and opposite a shielding plate broadly comprising a plurality of apertures.

In accordance with the present invention, a gas turbine engine broadly comprises a compressor; a combustor; and a turbine, wherein the turbine includes an integrated manifold broadly comprising a plenum defined by a manifold disposed in connection with a divider plate and opposite a shielding plate broadly comprising a plurality of apertures and means for integrally mounting to the turbine.

In accordance with the present invention, a method for actively controlling clearances within a gas turbine engine broadly comprises the steps of introducing a quantity of working fluid into an integrated manifold mounted to a turbine of a gas turbine engine; circulating the working fluid throughout the integrated manifold and into the turbine; and increasing a clearance distance between two components of the turbine.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

The active clearance control system described herein employs a single structure capable of being integrated into a gas turbine engine to supply, distribute and deliver working fluid while minimizing both weight and costs. The single structure also shields the engine components from harsh external environment of uneven temperatures and pressures. In addition, the single structure is spatially economical and can accommodate extra insulation and/or shielding if required. For purposes of explanation of the present invention, by "working fluid" means fluid supplied from the atmosphere and/or through one or more components of the gas turbine engine that enters the active clearance control system and possesses a temperature below the engine operating conditions or a temperature above the engine operating conditions.

The active clearance control system described herein generally comprises an integrated manifold having a plenum defined by a manifold disposed opposite a shielding plate and having a divider plate disposed therebetween. The shielding plate includes a plurality of apertures to permit working fluid to enter the engine casing. The divider plate isolates the working fluid within the active clearance control system and uniformly distributes the air pressure. The integrated manifold includes one or more integral mounting devices for attachment to a turbine section of gas turbine engine. In the alternative, the integrated manifold includes a means for integrally mounting to the turbine section.

Figure 1:
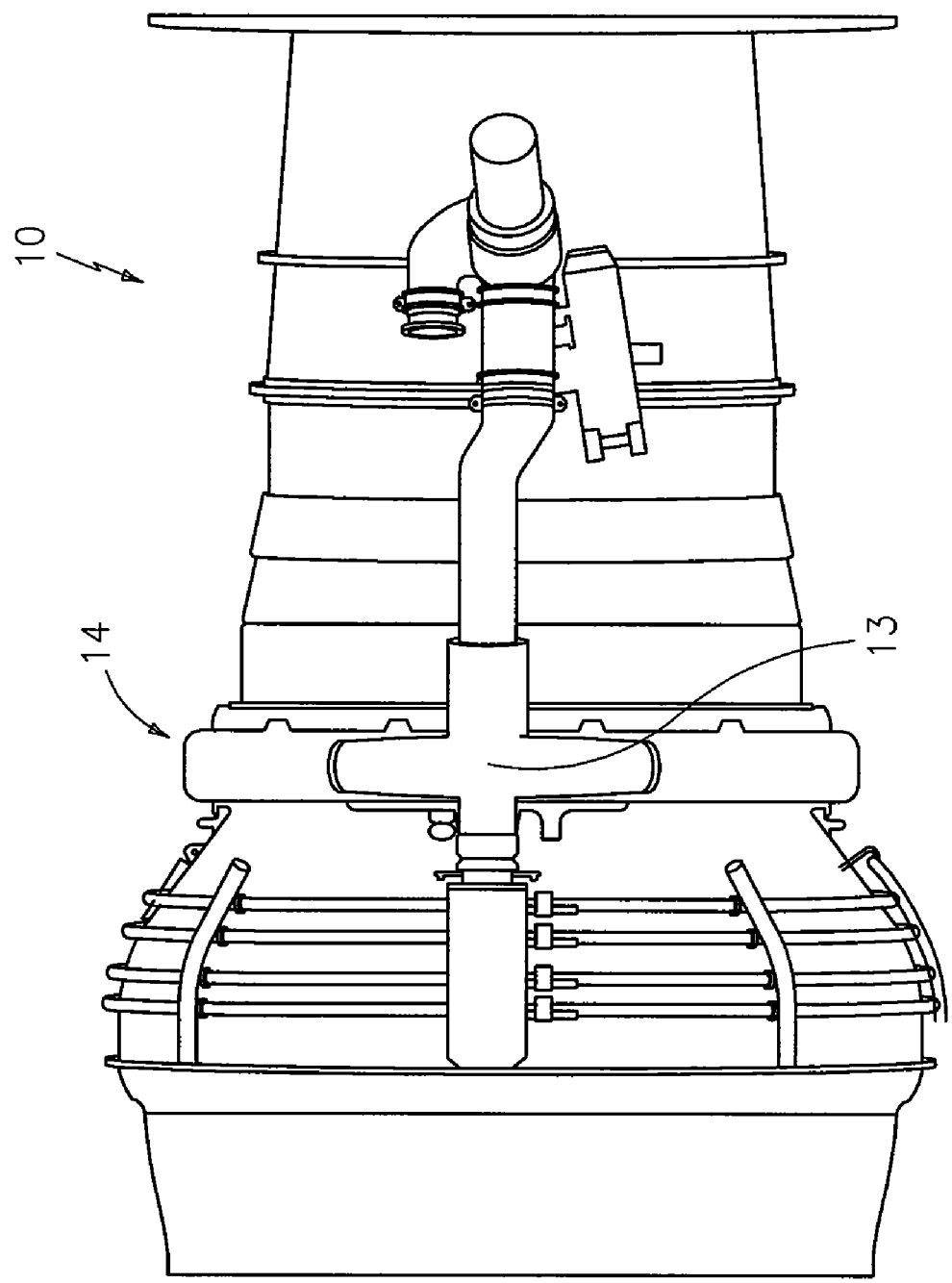
FIG. 1 is a representation of a gas turbine engine equipped with an active integrated clearance control system of the present invention.
Figure 2:
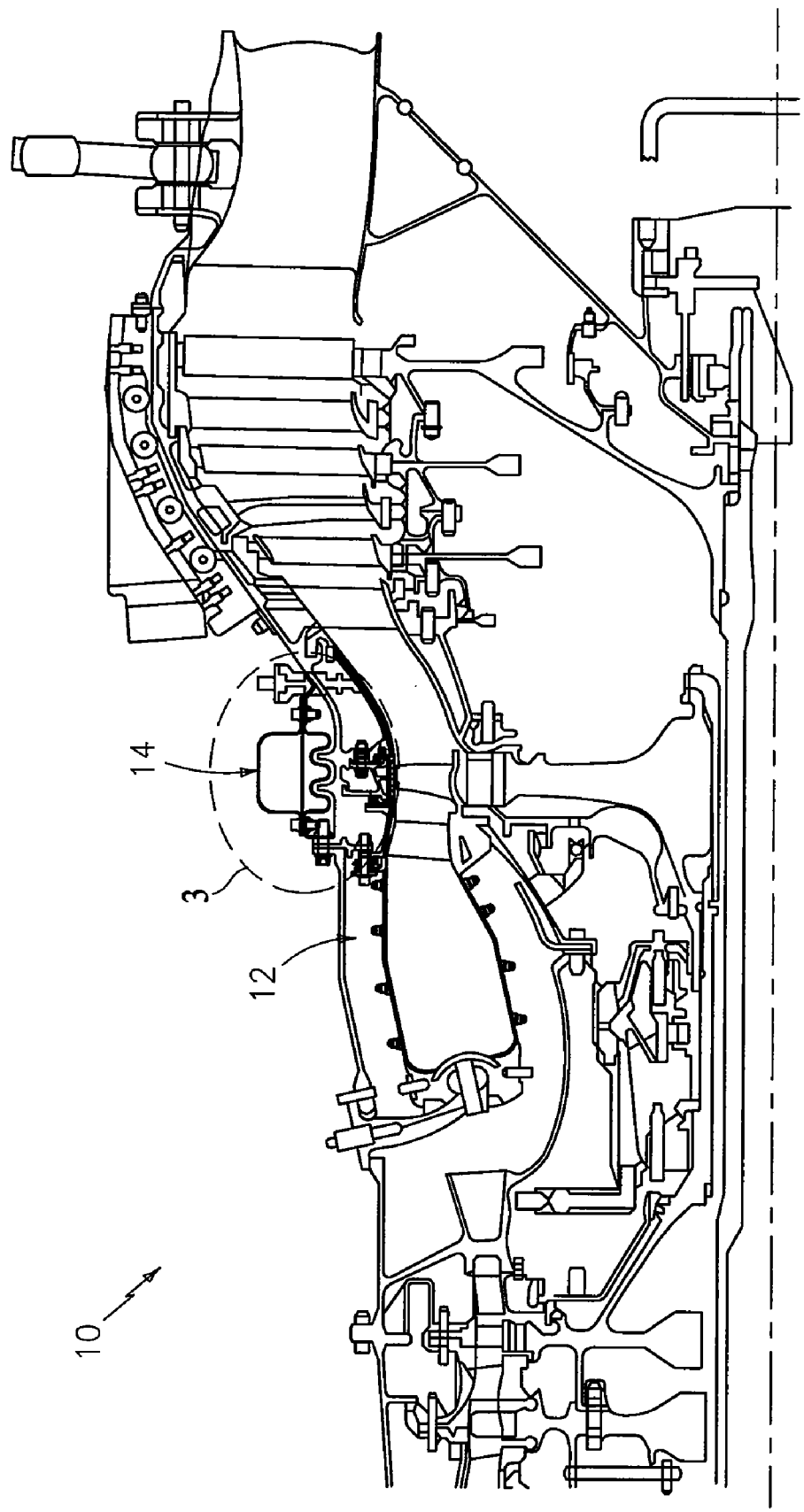
FIG. 2 cross-sectional view in part of the active integrated clearance control system integrated within a high-pressure turbine of the gas turbine engine of FIG. 1.
Figure 3:
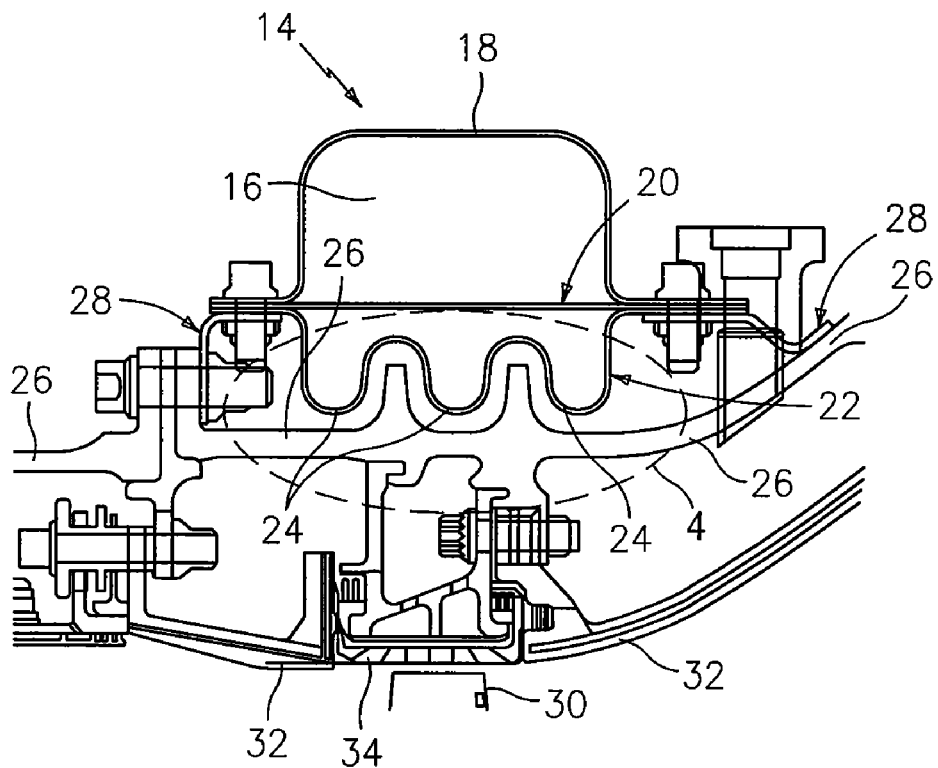
FIG. 3 is a representation of an enlarged area 3 of FIG. 2.
Figure 4:
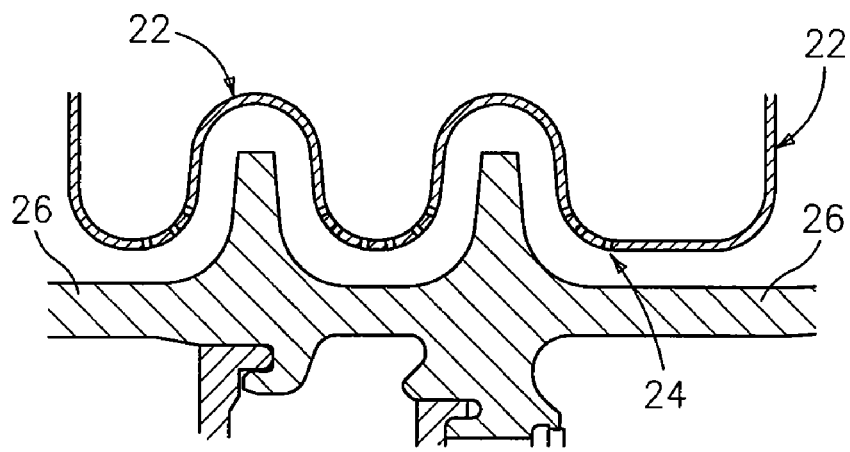
FIG. 4 is a representation of an enlarged area 4 of FIG. 3.

Referring now to FIGS. 1 and 2, a representation of a gas turbine engine 10 equipped with an active clearance control system 14 of the present invention is shown. A representation of a cross-sectional view in part of the active clearance control system integrally mounted to a turbine 12 in the gas turbine engine 10 is shown in FIG. 2. Generally, gas turbine engine 10 includes a compressor, a combustor and a turbine. The turbine 12 may consist of a single section or a low-pressure turbine section and a high-pressure turbine engine section. It is contemplated that the active clearance control system 14 described herein may be used for either high-pressure or low-pressure applications. For example, the active clearance control system 14 may be mounted to the high-pressure turbine section where the operating conditions, e.g., temperature and pressure, are most extreme.

Referring generally now to FIGS. 1 through 4, the active clearance control system 14 generally comprises an integrated manifold comprising a plenum 16 defined by a manifold 18 disposed in connection with a divider plate 20 and disposed opposite a shielding plate 22 comprising a plurality of apertures 24. The apertures 24 permit working fluid to impinge the case 26. The working fluid then circulates and exits into the atmosphere between shielding plate 22 and case 26. The integrated manifold also includes a means for integrally mounting to a case 26 of the turbine. For example, one or more integral mounting devices 28 may be used to fixedly attach the system 14 to the case 26. Suitable integral mounting devices may include, but are not limited to, brackets, screws, bolts, punches, rivets, welds, clips, and combinations thereof, and the like.

In employing the active clearance control system described herein, a quantity of working fluid may be introduced from the atmosphere, for example, ram air, or through the compressor stage of the gas turbine engine 10 and into an aperture 13 of the manifold structure 18. The working fluid is not yet subjected to the extreme operating conditions present within the gas turbine engine 10 so the working fluid possesses a temperature lower than the operating temperature of the engine 10, thus providing a cooling effect. The working fluid travels through the plenum 16 and enters the turbine 12 through the plurality of apertures 24 found throughout the shielding plate 22. The working fluid circulates through the apertures 24 and turbine 12 and eventually rises in temperature.

When the working fluid possesses a temperature lower than the engine's operating temperature, the working fluid makes contact with a plurality of blade tips 30 of one or more rotor assemblies, along with other components, of the gas turbine engine 10, and cools the blade tips 30. The blade tips 30 contract and the thermal growth experienced by the blades is reduced. As a result, the blade tip to shroud clearance, and/or an abradable material 34 concentrically disposed about the shroud 32, increases and eliminates transient clearance interference.

When the working fluid possesses a temperature greater than the engine's operating temperature, the working fluid makes contact with the shroud 32, along with other components of the gas turbine engine 10, and warms the shroud 32. The shroud 32 expands and the thermal growth experienced by the shroud 32 increases. As a result, blade tip to shroud clearance distance increases and eliminates transient clearance interference.

Throughout this process of increasing clearance distance and eliminating transient clearance interference, additional working fluid continues to be supplied to the active clearance control system of the present invention. For example, an electronic engine control system may schedule the working fluid intake into the active clearance control system.

The active clearance control system may comprise any materials suitable for use in the operating environment of a gas turbine engine. Suitable materials may include, but are not limited to, a nickel based superalloy, a cobalt based superalloy, a ferrous alloy such as steel, a titanium alloy, a copper alloy, and combinations thereof.

The active clearance control system of the present invention regulates the temperature and controls the thermal growth, that is, the expansion and/or contraction, of gas turbine engine components, such as blade and blade tips, shroud, case, and the like, and thereby control the blade tip to shroud clearance. The present active clearance control system may be switched or modulated responsive to various engine, aircraft, or environmental parameters for causing a reduction in blade tip to shroud clearance when such clearance control is most advantageous. In addition, the present active clearance control system is designed to utilize fewer parts so that the system itself does not exert inward radial forces upon the shroud and interfere with the blades.

It is to be understood that the invention is not limited to the illustrations described and shown herein, which are deemed to be merely illustrative of the best modes of carrying out the invention, and which are susceptible to modification of form, size, arrangement of parts, and details of operation. The invention rather is intended to encompass all such modifications which are within its spirit and scope as defined by the claims.

What is claimed is:

1. A gas turbine engine, consisting of:
   a compressor;
   a combustor; and
   a turbine,
wherein said turbine includes a means for circulating a quantity of working fluid from an atmosphere having a temperature lower than an operating temperature of a gas turbine engine, said means for circulating is an integrated manifold consisting of a first aperture in fluid communication with said atmosphere and a plenum defined by a single manifold disposed in connection with a single divider plate and opposite a shielding plate comprising a plurality of second apertures and means for integrally mounting to said turbine.

2. The gas turbine engine of claim 1, wherein said integrated manifold further consists of an integral mounting device selected from the group consisting of bracket, screw, bolt, punch, rivet, weld, clip, and combinations thereof.

3. A method for actively controlling clearances within a gas turbine engine, consisting of the steps of:
   providing a gas turbine engine comprising a compressor, a combustor, and a turbine, wherein said turbine includes an integrated manifold consisting of a first aperture in fluid communication with an atmosphere and a plenum defined by a single manifold disposed in connection with a single divider plate and opposite a shielding plate comprising a plurality of second apertures and means for integrally mounting to said turbine;
   drawing a quantity of working fluid from said atmosphere having a temperature lower than an operating temperature of a gas turbine engine;
   introducing said quantity of working fluid into said first aperture in fluid communication with said plenum;
   circulating said working fluid throughout said turbine via only said plenum and a plurality of second apertures formed in a shielding plate of said integrated manifold; and
   increasing a clearance distance between two components of said turbine.

4. The method of claim 3, wherein increasing consists of increasing a clearance distance between a plurality of blade tips of one or more rotor assemblies of said turbine and a shroud of said turbine.

5. The method of claim 3 wherein increasing consists of increasing a clearance distance between a plurality of blade tips of one or more rotor assemblies of said turbine and an abradable material concentrically disposed about a shroud of said turbine.

6. The method of claim 3 wherein introducing consists of introducing said quantity of working fluid from said atmosphere.

7. The method of claim 3, wherein introducing consists of introducing said quantity of working fluid into said aperture from the atmosphere.

* * * * *